United States Patent
Echigo et al.

(10) Patent No.: US 10,384,395 B2
(45) Date of Patent: Aug. 20, 2019

(54) THREE-DIMENSIONAL OBJECT BUILDING APPARATUS AND METHOD FOR BUILDING THREE-DIMENSIONAL OBJECT

(71) Applicant: HONDA MOTOR CO., LTD., Tokyo (JP)

(72) Inventors: Takaharu Echigo, Tochigi (JP); Akio Shimoda, Tochigi (JP); Keisuke Takahashi, Tochigi (JP); Kazunori Kawai, Tochigi (JP); Tadashi Yoshida, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 127 days.

(21) Appl. No.: 15/642,769

(22) Filed: Jul. 6, 2017

(65) Prior Publication Data

US 2017/0297110 A1    Oct. 19, 2017

Related U.S. Application Data

(62) Division of application No. 14/108,973, filed on Dec. 17, 2013, now Pat. No. 9,731,450.

(30) Foreign Application Priority Data

Dec. 25, 2012    (JP) ................................. 2012-280834

(51) Int. Cl.
*B29C 64/20*    (2017.01)
*B29C 64/153*    (2017.01)
(Continued)

(52) U.S. Cl.
CPC .......... *B29C 64/153* (2017.08); *B22F 3/1055* (2013.01); *B29C 64/20* (2017.08);
(Continued)

(58) Field of Classification Search
CPC ...... B29C 64/153; B29C 64/20; B29C 64/286
(Continued)

(56) References Cited

U.S. PATENT DOCUMENTS

| 2004/0045941 A1 | 3/2004 | Herzog et al. |
| 2004/0094728 A1 | 5/2004 | Herzog et al. |

(Continued)

FOREIGN PATENT DOCUMENTS

| JP | 05-096633 | 4/1993 |
| JP | 2004-514053 | 5/2004 |

(Continued)

OTHER PUBLICATIONS

Japanese Office Action dated Jun. 30, 2015 with English translation, 7 pages, filed by IDS of Jul. 24, 2015.

(Continued)

*Primary Examiner* — Christina A Johnson
*Assistant Examiner* — Xue H Liu
(74) *Attorney, Agent, or Firm* — Rankin, Hill & Clark LLP

(57) ABSTRACT

The three-dimensional object building apparatus includes a powder delivering unit that delivers a powder on an object building area, a powder flattening device that flattens the powder delivered from the powder delivering unit to form a powder layer, and a light beam radiating unit that is disposed above the object building area and radiates a light beam on the powder layer to sinter or melt solidify the powder for building an object. The three-dimensional object building apparatus also includes a transferring mechanism that moves the light beam radiating unit in three-dimensional directions, and a shroud that moves integrally with the light beam radiating unit and surrounds a space above an area of the powder layer that is smaller than the object building area around a radiation of the light beam. The powder delivering (Continued)

unit and the powder flattening device move integrally with the light beam radiating unit.

4 Claims, 7 Drawing Sheets

(51) Int. Cl.
*B22F 3/105* (2006.01)
*B29C 64/286* (2017.01)

(52) U.S. Cl.
CPC .... *B29C 64/286* (2017.08); *B22F 2003/1056* (2013.01); *Y02P 10/295* (2015.11)

(58) Field of Classification Search
USPC ........................................................ 264/497
See application file for complete search history.

(56) References Cited

U.S. PATENT DOCUMENTS

2011/0278773 A1    11/2011  Bokodi et al.
2011/0285060 A1    11/2011  Yamamoto et al.
2014/0175708 A1     6/2014  Echigo et al.

FOREIGN PATENT DOCUMENTS

| | | |
|---|---|---|
| JP | 2004-516166 | 6/2004 |
| JP | 2007-146216 | 6/2007 |
| JP | 2007-216595 | 8/2007 |
| JP | 2010-265530 | 11/2010 |
| JP | 2011-251529 | 12/2011 |
| JP | 2012-246541 | 12/2012 |
| JP | 2014-125643 | 7/2014 |

OTHER PUBLICATIONS

Japanese Decision to Dismiss an Amendment dated Nov. 10, 2015, 5 pages, filed by IDS of Jan. 12, 2016.
Japanese Decision of Rejection dated Nov. 10, 2015, 1 page, filed by IDS of Jan. 12, 2016.
Japanese Notice of Reason for Rejection dated Nov. 1, 2016, 6 pages, filed by IDS of Nov. 22, 2016.

THREE-DIMENSIONAL OBJECT BUILDING APPARATUS AND METHOD FOR BUILDING THREE-DIMENSIONAL OBJECT

CROSS REFERENCE TO RELATED APPLICATIONS

This application claims the foreign priority benefit under 35 U.S.C. § 119 of Japanese Patent Application No. 2012-280834 filed on Dec. 25, 2012, the disclosure of which is incorporated herein in its entirety by reference.

TECHNICAL FIELD

The present invention relates to a three-dimensional object building apparatus and a method for building a three-dimensional object, in which an object is built by sintering a powder with a light beam.

BACKGROUND ART

In a conventional three-dimensional object building apparatus (SLM (Selective Laser Melting) apparatus), which is known for example as shown in Patent Document 1, a scanner for radiating a laser beam is provided above the object building table (the work piece platform in Patent Document 1) on which an object is put. In order to enlarge the size of the object to be built, a scanner is generally fixed on a X-Y drive axis device such as a gantry (the cross-slide support in Patent Document 1) so as to be movable in the directions of X and Y axes.

PRIOR TECHNICAL DOCUMENT

Patent Document

[Patent Document 1] Japanese Patent Application Laid-Open Publication No. 2004-516166 (which corresponds to WO 2002/036330)

SUMMARY OF THE INVENTION

Technical Problem

The technology of Patent Document 1 prolongs a time to conduct a powder delivering process and a powder smoothing process, and therefore tends to prolong a cycle time of object building. Moreover, because the apparatus is configured such that the whole chamber (space) for object building above the object building table is filled with an inert gas atmosphere, a consumption amount of the inert gas increases, and the cost for object building tends to increase.

The present invention has been created to solve the above problem, and its purpose is to provide a three-dimensional object building apparatus and a method of building a three-dimensional object, which can successfully shorten the object building cycle time and reduce the consumption amount of the ambient gas such as inert gas.

Solution to Problem

To solve the above problem, the present invention is a three-dimensional object building apparatus comprising: a powder delivering unit that delivers a powder on an object building area; a powder flattening device that flattens the powder delivered from the powder delivering unit to form a powder layer; a light beam radiating unit that is disposed above the object building area and radiates a light beam on the powder layer to sinter or melt solidify the powder for building an object; a transferring mechanism that moves the light beam radiating unit in three-dimensional directions; a cover that moves integrally with the light beam radiating unit and covers a space above an area of the powder layer that is smaller than the object building area around a radiation of the light beam; wherein the powder delivering unit and the powder flattening device move integrally with the light beam radiating unit.

According to this three-dimensional object building apparatus, the advantages described below are achieved.

(1) The size of the object to be built can be easily enlarged up to the three-dimensional range of movement of the transferring mechanism that holds the light beam radiating unit.

(2) The cycle time of object building can be shortened, because the powder delivering unit and the powder flattening device are configured integrally with the light beam radiating unit so that a powder layer can be formed at the time of movement of the light beam radiating unit.

(3) The apparatus can be configured compact, because the powder delivering unit and the powder flattening device are configured integrally with the light beam radiating unit so that drive sources for respective operations of the powder delivering unit and the powder flattening device become unnecessary.

(4) The consumption amount of the ambient gas can be reduced, because the ambient gas is supplied only to the inside of the cover that covers the powder layer, the area of which is smaller than the object building area.

(5) Since the light beam radiating unit is configured integrally with the powder delivering unit and the powder flattening device, the dimensional precision is improved between the light beam radiating unit and the surface of a powder layer formed by the powder delivering unit and the powder flattening device. Accordingly, the focal point of a light beam at the powder layer becomes stable, and the precision of object building is improved.

(6) The cycle time of object building can be further shortened, because the object can be built by radiating a light beam while the light beam radiating unit is brought by the transferring mechanism.

Moreover, the apparatus may be configured such that the powder delivering unit and the powder flattening device are disposed on a side of the cover facing in a direction of forward movement.

According to this three-dimensional object building apparatus, the powder delivering unit and the powder flattening device can be configured integrally with the cover with a simple structure.

Moreover, the apparatus may be configured such that the powder delivering unit comprises a powder storage tank with a powder dropping opening formed at a lower portion thereof, and the powder flattening device comprises a blade disposed between the powder storage tank and the cover.

According to this three-dimensional object building apparatus, the powder delivering unit and the powder flattening device can be made of members having simple structures and thereby can be attached to the cover easily.

Moreover, the apparatus may further comprise an open-close door that opens and closes the powder dropping opening of the powder storage tank.

According to this three-dimensional object building apparatus, delivery of the powder from the powder storage tank can be easily controlled by opening and closing operation of the open-close door.

Moreover, the apparatus may be configured such that the cover comprises an ambient-gas supplying port for supplying an ambient gas into an inside of the cover and a fume suction port for suctioning a fume generated in the inside of the cover.

According to this three-dimensional object building apparatus, the ambient gas can be easily supplied to the inside of the cover and the fume can be easily ejected outside.

Moreover, the apparatus may be configured such that the cover is provided with a skirt member that is movable vertically and blocks a gap made between a lower end of the cover and the powder layer when lowered down.

According to this three-dimensional object building apparatus, leakage of the ambient gas from the gap made between the cover and the powder layer can be prevented efficiently.

Moreover, in the present invention, the method comprises a step for providing a powder delivering unit, a powder flattening device, a light beam radiating unit and a cover structured integrally with one another such that these are movable in three-dimensional directions, wherein the powder delivering unit delivers a powder on an object building area, the powder flattening device flattens a surface of the powder delivered from the powder delivering unit to form a powder layer, the light beam radiating unit is disposed above the object building area and radiates a light beam on the powder layer to sinter or melt solidify the powder for building the object, the cover surrounds a space above an area of the powder layer that is smaller than the object building area around a radiation of the light beam; a one-layer building step comprising a powder layer forming step for moving the cover in lateral direction so that a powder of amount corresponding to the moved distance is delivered by the powder delivering unit below the cover and flattened by the powder flattening device, an object building step for radiating a light beam on the layer flattened in the powder layer forming step for building the object, wherein one powder layer is built by repeating the powder layer forming step and the object building step; wherein the three-dimensional object is built by repeating uplifting the cover and the one-layer building step.

According to this method of building a three-dimensional object, the same advantages as aforementioned (1) to (5) can be obtained.

Moreover, the method may comprise the step of building a three-dimensional makeshift wall surrounding a space around the object for preventing collapse of the powder in the space around the object to be built.

According to this method of building a three-dimensional object, collapse of the powder surrounding the object can be prevented by the makeshift wall Advantageous Effects of Invention According to the present invention, shortening the object building cycle time and reducing the consumption amount of the ambient gas such as inert gas can be achieved.

DETAILED DESCRIPTION

Figure 1:
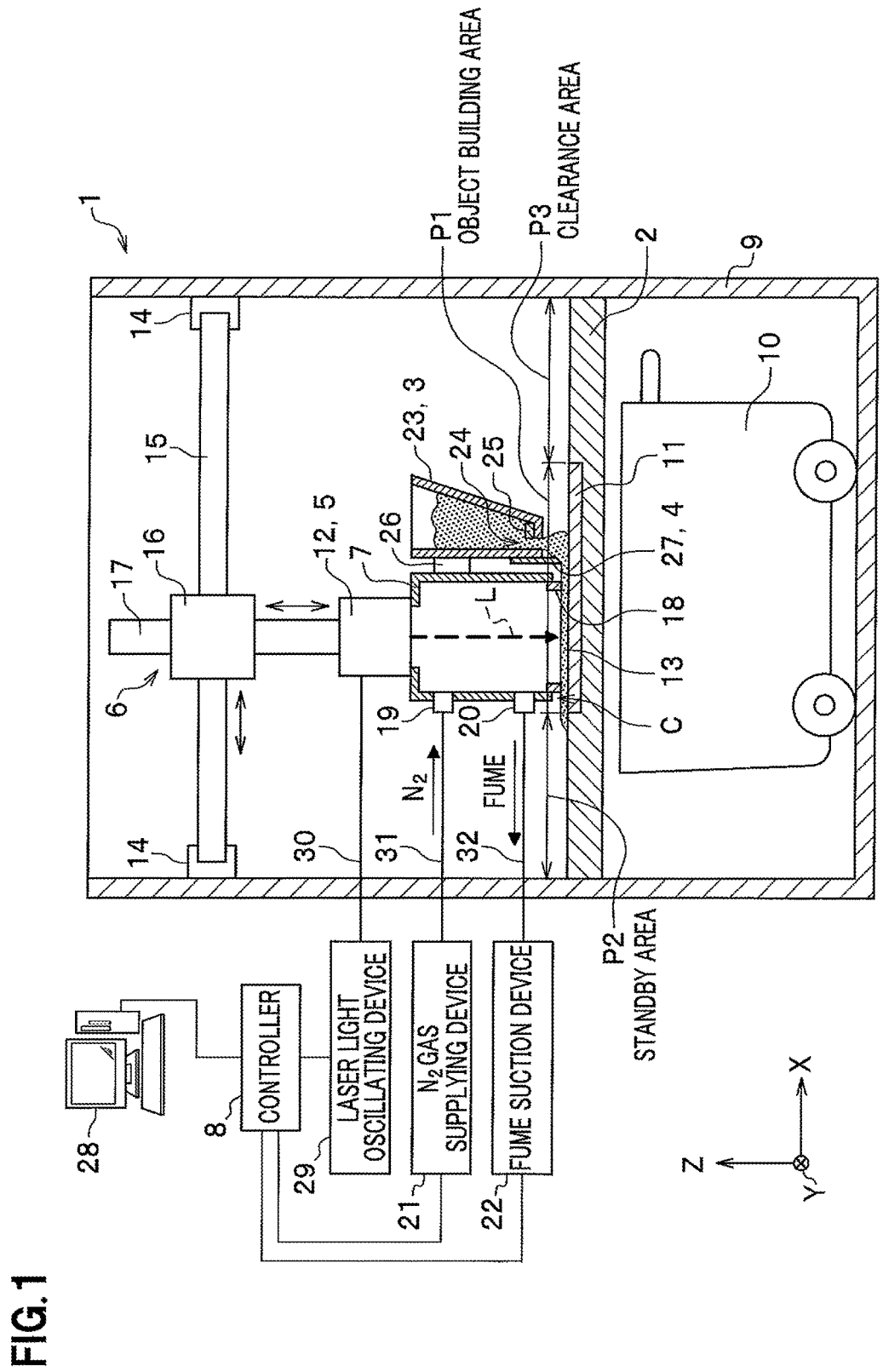
FIG. 1 is a side view of a three-dimensional object building apparatus according to an embodiment of the present invention.

In FIG. 1, a three-dimensional object building apparatus 1 according to the present embodiment is configured to mainly comprise: an object building bed 2; a powder delivering unit 3 which delivers a powder on an object building area $P_1$ of the object building bed 2; a powder flattening device 4 which flattens the powder delivered from the powder delivering unit 3 to form a powder layer 13; a light beam radiating unit 5 which is disposed above the object building area $P_1$ and radiates a light beam L on the flattened powder layer 13 to either sinter or melt solidify the powder in order to build an object; a transferring mechanism 6 which moves the light beam radiating unit 5 in three-dimensional directions; a cover (hereinafter referred to as "shroud") 7 which surrounds a space above an area of the powder layer 13 that is smaller than the object building area $P_1$ around radiation of the light beam L; and a controller 8.

The shroud 7, the powder delivering unit 3 and the powder flattening device 4 move integrally with the light beam radiating unit 5.

[Object Building Bed 2]

The object building bed 2 is a plate-shaped member disposed horizontally inside an apparatus frame 9 formed for example in a shape of a rectangular box, and is secured on an apparatus frame 9. A trolley 10 for collecting a residual powder is placed below the object building bed 2. The residual powder generated on the object building bed 2 is collected by the trolley 10 via an ejection passage (not shown) which is bored through the object building bed 2 vertically, for example. An object placement plate 11 is detachably fitted into one part of an upper surface of the object building bed 2 so as to be flush with the object building bed 2. An object is to be built on an upper surface of this object placement plate 11, and the space above the object placement plate 11 constitutes an object building area $P_1$.

[Light Beam Radiating Unit 5]

The light beam radiating unit 5 includes a light beam radiating device 12 which radiates a light beam L such as a laser light. Lenses, mirrors, etc are built in the light beam radiating device 12, and the scope of radiation of the light beam L is adjustable within a scope in the horizontal directions (scope in X-Y axes) defined by a predetermined distance.

[Transferring Mechanism 6]

Figure 2:
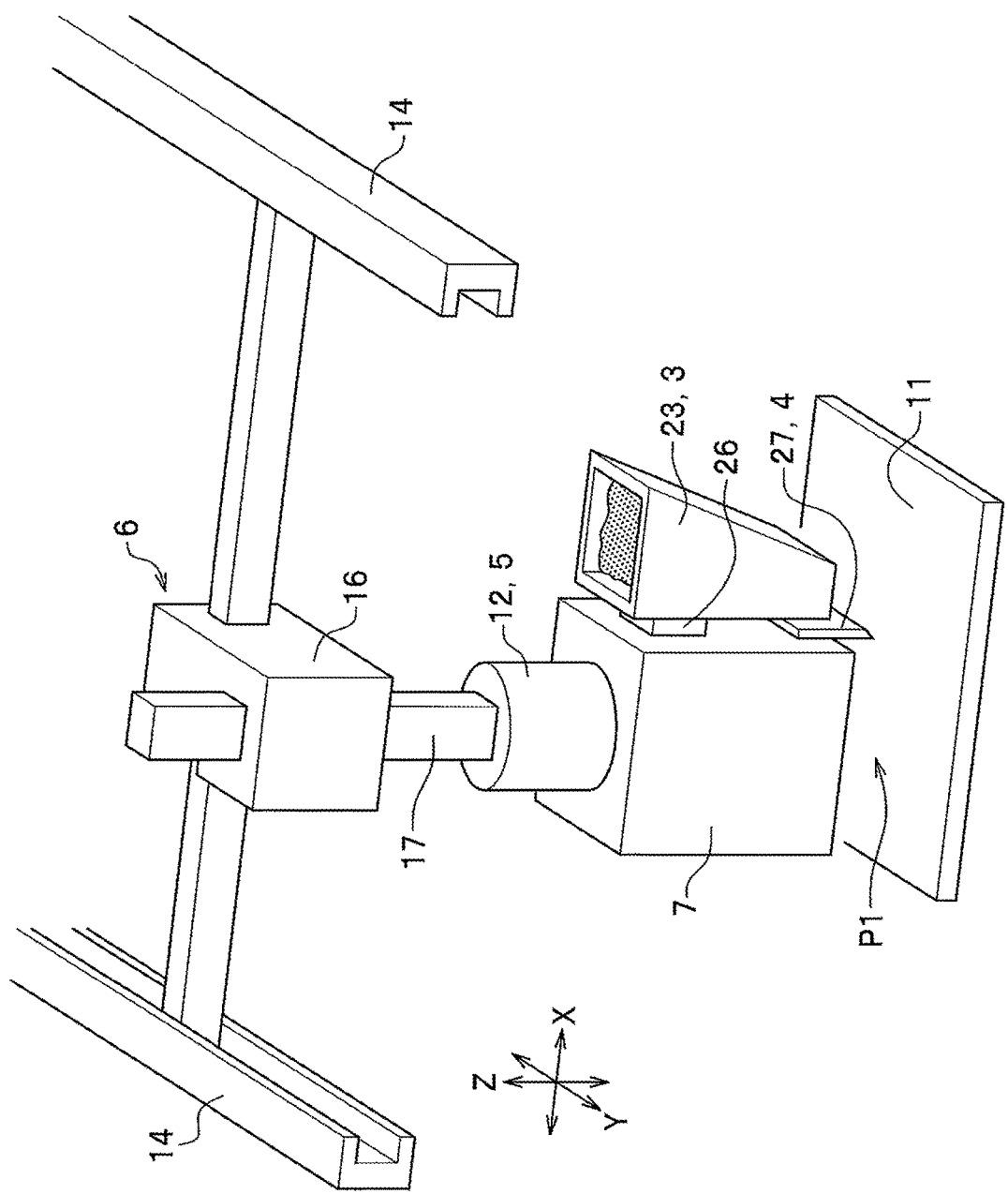
FIG. 2 is an exterior perspective view of a three-dimensional object building apparatus according to the embodiment.

As shown in FIG. 1 and FIG. 2, the transferring mechanism 6 comprises: a pair of fixed guide rails 14 attached on the apparatus frame 9; a movable guide rail 15 which bridges between the pair of fixed guide rails 14 and is moved in the Y-axis direction by a drive source not shown; a base 16 which is attached to the movable guide rail 15 and is moved in X-axis direction along the movable guide rail 15 by a drive source not shown; and a support rod member 17 which is oriented vertically and is moved in Z-axis direction relative to the base 16 by a drive source not shown. The light beam radiating device 12 is attached to the lower end of the support rod member 17. The above structure enables the transferring mechanism 6 to move the light beam radiating device 12 in three-dimensional directions.

[Shroud 7]

The shroud 7 is made up of a hollow cover member with an opening formed in its lower end. In FIG. 2, it is depicted as a member of a rectangular shape, but it may be in other shapes such as a cylindrical shape. The upper portion of the shroud 7 is attached integrally to the lower end of the light beam radiating device 12 so as not to interfere with the radiation area of the light beam L. The area of the opening at the lower end of the shroud 7 is formed smaller than the object building area $P_1$. A skirt member 18 is provided along the periphery of the lower end of the shroud 7, and is movable vertically in such a manner that, when lowered down, the skirt member 18 blocks a gap C made between the lower end of the shroud 7 and the powder layer 13. The skirt member 18 is a frame-shaped member formed along the side surfaces of the shroud 7, and is moved up and down, for example, by a drive source such as a motor equipped on the shroud 7.

Moreover, the shroud 7 has an ambient-gas supplying port 19 for supplying $N_2$ gas as an ambient gas into the inside of the shroud 7 and a fume suction port 20 for suctioning a fume generated in the inside of the shroud 7. The ambient-gas supplying port 19 and the fume suction port 20 are connected respectively to a $N_2$ gas supplying device 21 and a fume suction device 22 provided outside the apparatus frame 9 via flexible hoses 31 and 32.

[Powder Delivering Unit 3]

In FIG. 1, the powder delivering unit 3 is made up of a powder storage tank 23 with a powder dropping opening 24 formed in its lower portion. The powder storage tank 23 is formed for example in a funnel-shape having a hopper portion of which the cross-sectional area becomes smaller as it goes toward the powder dropping opening 24, and its upper portion is formed with an opening for filling the powder. The powder is, for example, a metal powder and the like of particle size ranging from about several to several tens μm. The powder storage tank 23 is equipped with an open-close door 25 for opening and closing the powder dropping opening 24. The open-close door 25 opens and closes the powder dropping opening 24 by sliding in the lateral direction by means of a drive source such as a motor (not shown) equipped on the powder storage tank 23, for example. The powder storage tank 23 is fixed on the shroud 7 via a bracket 26 so as to be located on a side of the shroud 7 facing in the direction of forward movement (right direction in FIG. 1).

[Powder Flattening Device 4]

The powder flattening device 4 is made up of a blade 27 in a shape of a rectangular flat plate, for example. The blade 27 is located between the powder storage tank 23 and the shroud 7 with its plate surface extending along a substantially vertical direction, and smoothes the powder with its longitudinal lower edge arranged horizontally to form a powder layer 13. The blade 27 is fixed either on an outer surface of the powder storage tank 23 as shown in FIG. 1 or on an outer surface of the shroud 7, by means of fastening screws or the like. The lower edge of the blade 27 is at a position lower than the position of the powder dropping opening 24 of the powder storage tank 23 and the position of the lower end of the shroud 7.

[Controller 8]

The controller 8 is composed of CPU and the like, and is located outside the apparatus frame 9 for example. The controller 8 controls a laser light oscillating device 29, the $N_2$ gas supplying device 21, the fume suction device 22, etc in accordance with commands from an operational terminal device 28 such as a personal computer. The aforementioned light beam radiating device 12 is connected to the laser light oscillating device 29 via an optical fiber cable 29.

[Explanation of Operation of Three-Dimensional Object Building Apparatus 1]

Figure 3A:
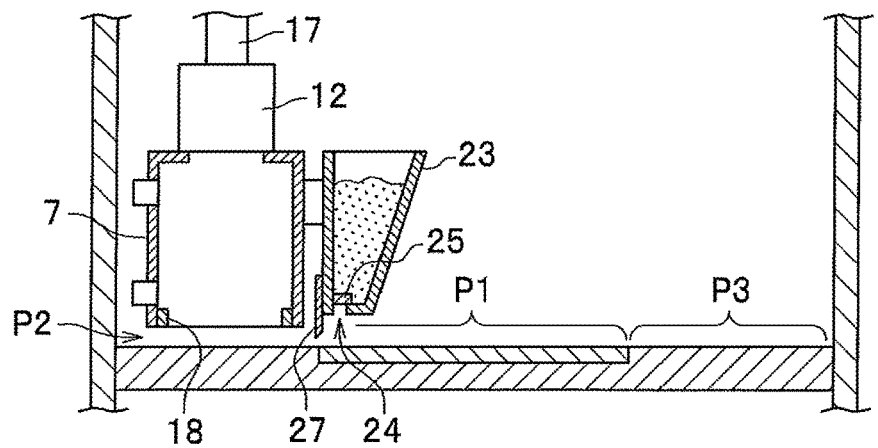
FIG. 3A is a diagram for explaining an operation of the three-dimensional object building apparatus according to the embodiment.

One example of operation of the three-dimensional object building apparatus 1 of above configuration will be described. FIG. 3A shows a state of the apparatus before the object building operation is initiated, and the shroud 7 is positioned at a standby area $P_2$ formed at one end side of the object building area $P_1$. The powder dropping opening 24 of the powder storage tank 23 is closed by the open-close door 25, and the skirt member 18 of the shroud 7 is uplifted. It is noted that the other end side of the object building area $P_1$ is formed as a clearance area $P_3$ of the powder storage tank 23.

Figure 3B:
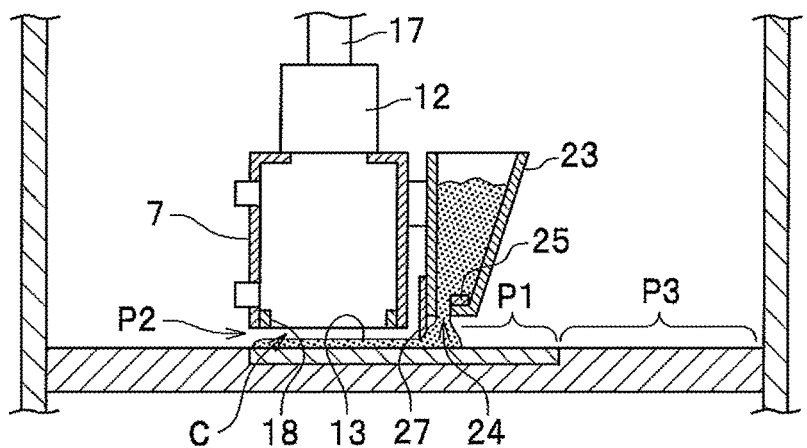
FIG. 3B is a diagram for explaining the operation of the three-dimensional object building apparatus according to the embodiment.

Starting from a state shown in FIG. 3A, the open-close door 25 opens, and the shroud 7 is moved forward toward the object building area $P_1$ by the transferring mechanism 6, and thereby a powder of the amount corresponding to the moved distance is delivered on the object placement plate 11 from the powder dropping opening 24 of the powder storage tank 23, and is smoothed by the blade 27 to be formed as a part of one layer of powder layer 13 below the shroud 7 (FIG. 3B). This step will be referred to as "powder layer forming step." It is noted that, before or after the shroud 7 starts moving, $N_2$ gas is supplied into the shroud 7 by the $N_2$ gas supplying device 21, and the fume suction device 22 is activated to circulate the ambient gas inside the shroud 7.

Figure 3C:
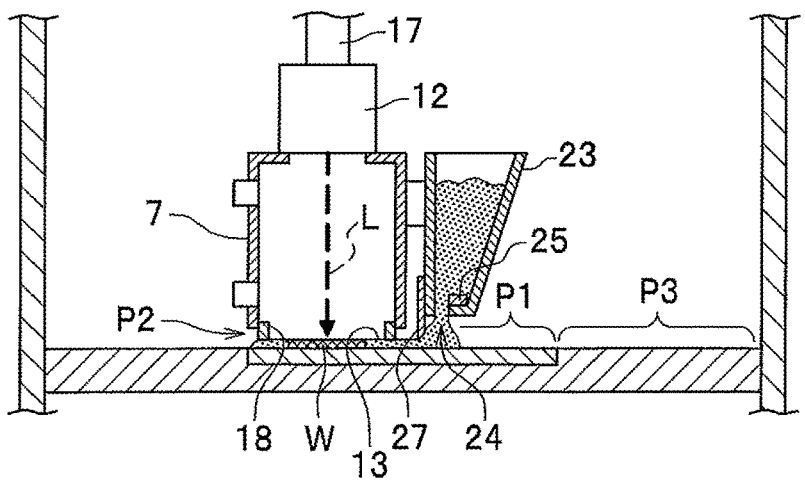
FIG. 3C is a diagram for explaining the operation of the three-dimensional object building apparatus according to the embodiment.

Next, in order to prevent $N_2$ gas leakage from the gap C made between the lower end of the shroud 7 and the powder layer 13, the skirt member 18 is lowered down to block the gap C as shown in FIG. 3C. It is noted that provision of the skirt member 18 is not necessary if the gap C is sized small enough to be able to disregard the amount of $N_2$ gas leakage. Moreover, the gap C may be blocked by lowering down the support rod member 17 of the transferring mechanism 6, i.e., by lowering down the shroud 7 itself, without providing the skirt member 18.

Next, a light beam L 12 is radiated from the light beam radiating device onto the powder layer 13, which has been smoothed in the powder layer forming step, in order to build a part of object W. This will be referred to as "object building step." The fume generated during object building is ejected from the fume suction port 20 by the fume suction device 22.

Figure 4A:
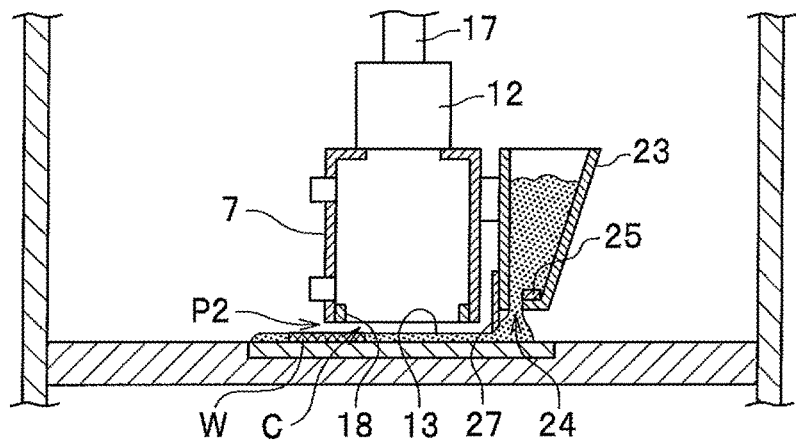
FIG. 4A is a diagram for explaining the operation of the three-dimensional object building apparatus according to the embodiment.
Figure 4B:
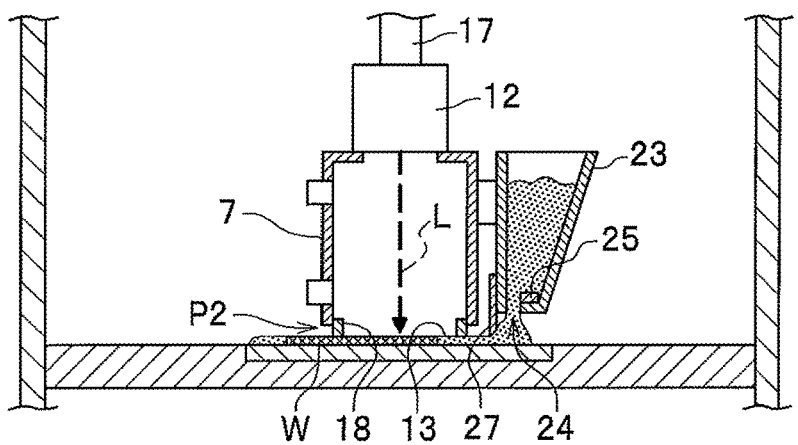
FIG. 4B is a diagram for explaining the operation of the three-dimensional object building apparatus according to the embodiment.
Figure 4C:
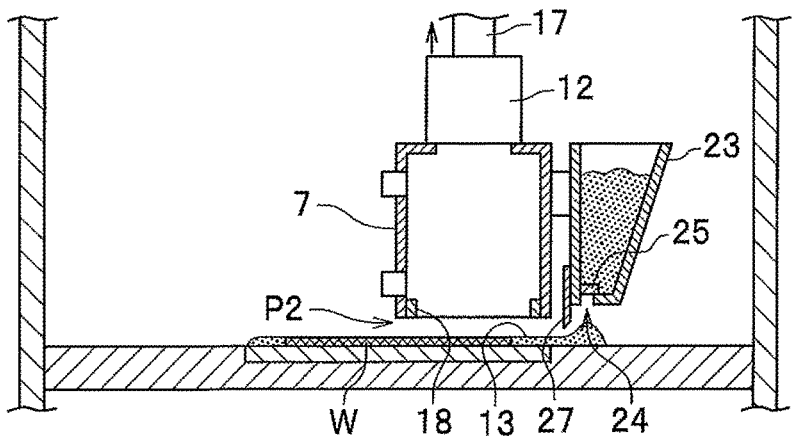
FIG. 4C is a diagram for explaining the operation of the three-dimensional object building apparatus according to the embodiment.

After finishing the object building step, the skirt member 18 is uplifted, and the shroud 7 is again brought forward by transferring mechanism 6, and thereby a powder of the amount corresponding to next object building is delivered from the powder dropping opening 24 of the powder storage tank 23 to an area adjacent to the already-built object W in the direction of forward movement (right side in FIG. 4A) and is smoothed by the blade 27 to form a powder layer 13 (a state of FIG. 4A). Then, the skirt member 18 is lowered down, and a light beam L from the light beam radiating device 12 is radiated on the powder layer 13, and a subsequent part of object W is built so as to continue from the part of object W shown in FIG. 3C (refer to FIG. 4B). As described above, by conducting the powder layer forming step and the object building step a plurality of times, one layer of powder layer 13 of the object W is built as shown in FIG. 4C. The process of building one layer of powder layer 13 by conducting the powder layer forming step and the object building step a plurality of times will be referred to as "one layer building step."

Figure 5A:
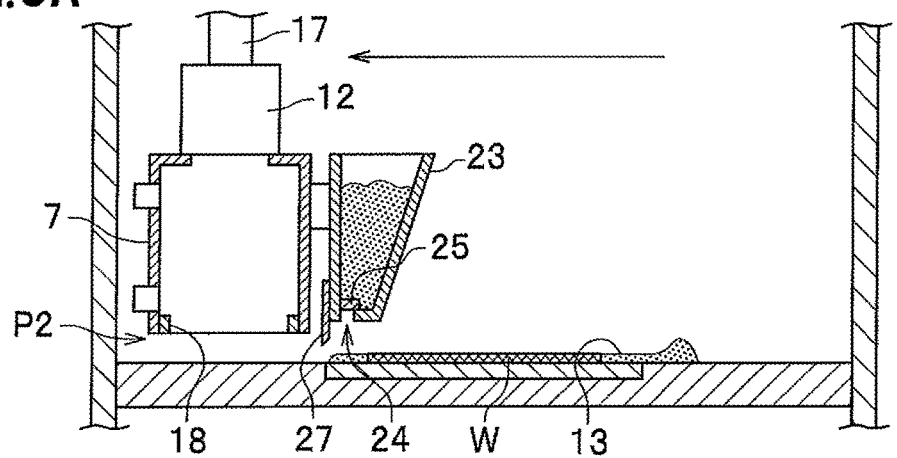
FIG. 5A is a diagram for explaining the operation of the three-dimensional object building apparatus according to the embodiment.
Figure 5B:
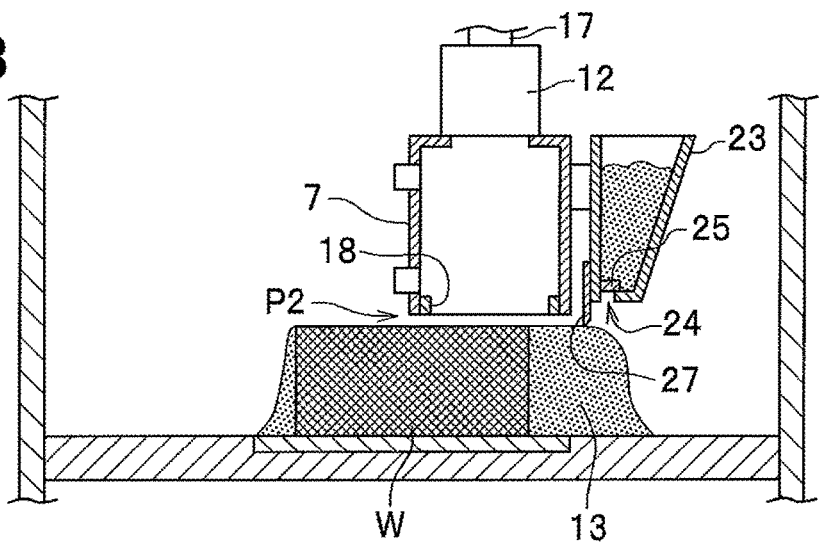
FIG. 5B is a diagram for explaining the operation of the three-dimensional object building apparatus according to the embodiment.

After finishing "one layer building step," the powder dropping opening 24 of the powder storage tank 23 is closed by the open-close door 25, and the support rod member 17 is uplifted by transferring mechanism 6 by a height corresponding to the thickness of a powder layer 13 that is to be formed subsequently, and the shroud 7 moves back to the standby area $P_2$ (FIG. 5A). Then, the second powder layer 13 is formed on the first powder layer 13 already formed, and the one layer building step shown in FIG. 3 and FIG. 4 is conducted again. By repeating the layer building step like this, building of the whole object W is completed as shown in FIG. 5B. It is noted that the shroud 7 stays in the standby area $P_2$ only a short length of time, and only a slight amount of $N_2$ gas leaks from the lower end of the shroud 7. If the situation allows, the supply of $N_2$ gas may be stopped while the shroud 7 is positioned at the standby area $P_2$.

Figure 6:
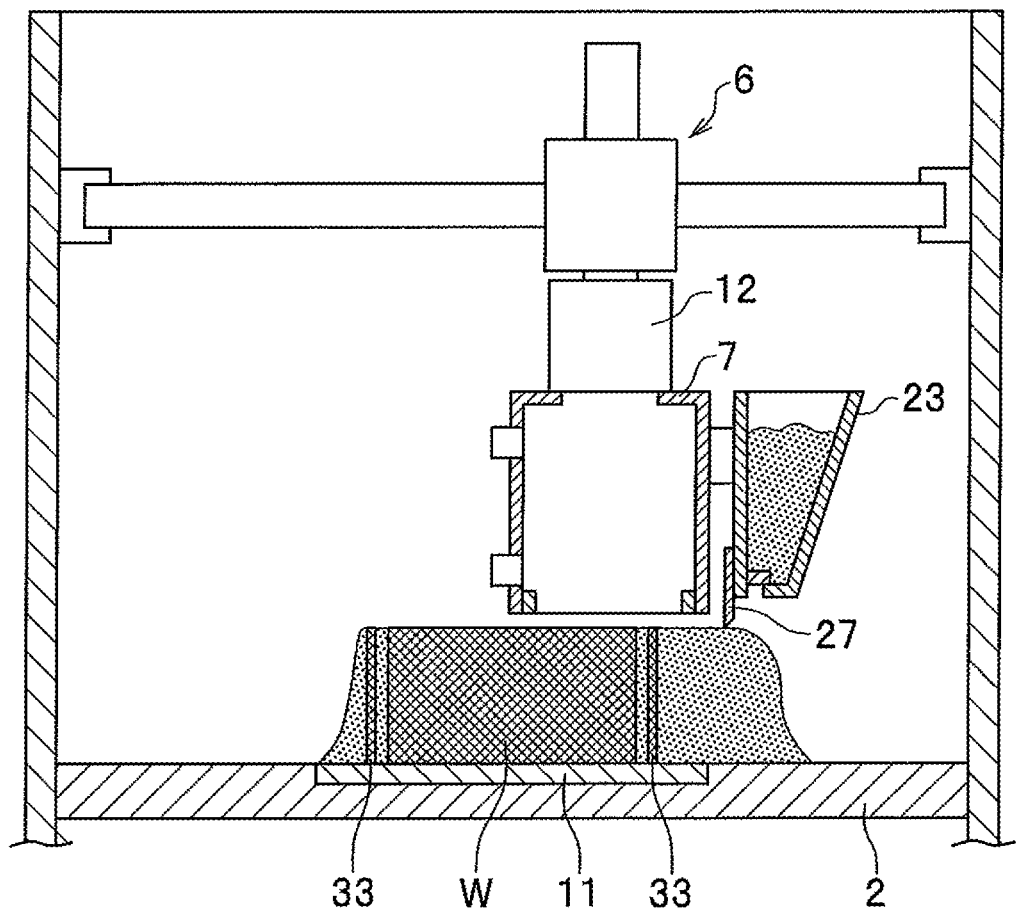
FIG. 6 is a side view of the three-dimensional object building apparatus when a makeshift wall is built.

Moreover, if a three-dimensional makeshift wall 33 surrounding a space around the object W is built as shown in FIG. 6 in the one layer building steps when the object W is built, a collapse of the powder surrounding the object W can be prevented by the makeshift wall 33.

The advantages explained below are achieved, if the three-dimensional object building apparatus 1 comprises the transferring mechanism 6 which moves the light beam radiating device 12 (the light beam radiating unit 5) in three-dimensional directions, the shroud 7 which moves integrally with the light beam radiating device 12 and encloses a space above an area of powder layer 13 that is smaller than the object building area $P_1$ around radiation of the light beam L, the powder storage tank 23 (the powder delivering unit 3) and the blade 27 (the powder flattening device 4) which moves integrally with the light beam radiating device 12, as described above.

(1) The size of the object W to be built can be easily enlarged up to the three-dimensional range of movement of the transferring mechanism 6 that holds the light beam radiating unit 5.

(2) The cycle time of object building can be shortened, because the powder delivering unit 3 and the powder flattening device 4 are configured integrally with the light beam radiating unit 5 so that a powder layer 13 can be formed at the time of movement of the light beam radiating unit 5.

(3) The apparatus can be configured compact, because the powder delivering unit 3 and the powder flattening device 4 are configured integrally with the light beam radiating unit 5 so that drive sources for respective operations of the powder delivering unit 3 and the powder flattening device 4 become unnecessary.

(4) The consumption amount of the ambient gas can be reduced, because the ambient gas is supplied only to the inside of the shroud 7 which covers the powder layer 13, the area of which is smaller than the object building area $P_1$.

(5) Since the light beam radiating unit 5 is configured integrally with the powder delivering unit 3 and the powder flattening device 4, the dimensional precision is improved between the light beam radiating unit 5 and the surface of a powder layer 13 formed by the powder delivering unit 3 and the powder flattening device 4. Accordingly, the focal point of a light beam L at the powder layer 13 becomes stable, and the precision of object building is improved.

(6) The cycle time of object building can be further shortened, because the object W can be built by radiating a light beam L while the light beam radiating unit 5 is brought by the transferring mechanism 6.

Moreover, if the powder delivering unit 3 and the powder flattening device 4 are disposed on a side of the shroud 7 facing in the direction of forward movement, the powder delivering unit 3 and the powder flattening device 4 can be configured integrally with the shroud 7 with a simple structure.

Moreover, if the powder delivering unit 3 is configured as the powder storage tank 23 with the powder dropping opening 24 at a lower portion thereof, and the powder flattening device 4 is configured as the blade 27 disposed between the powder storage tank 23 and the shroud 7, the powder delivering unit 3 and the powder flattening device 4 can be configured with members having simple structures and thereby can be attached to the shroud 7 easily.

Furthermore, if the open-close door 25 which opens and closes the powder dropping opening 24 of the powder storage tank 23 is provided, delivery of the powder from the powder storage tank 23 can be easily controlled by opening and closing operation of the open-close door 25. When the shroud 7 is formed with the ambient-gas supplying port 19 and the fume suction port 20, the ambient gas can be easily supplied to the inside of the shroud 7 and the fume can be easily ejected outside. Since the shroud 7 is provided with the skirt member 18, the leakage of ambient gas from the gap C made between the shroud 7 and the powder layer 13 can be prevented efficiently.

Figure 7A:
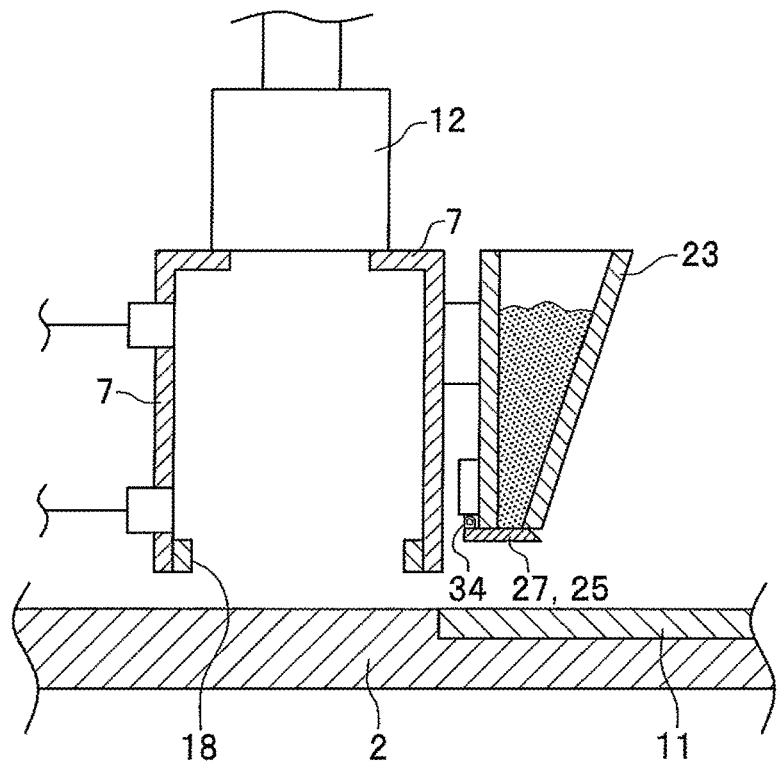
FIG. 7A is a side view of a variant structural example of an open-close door of the storage tank.
Figure 7B:
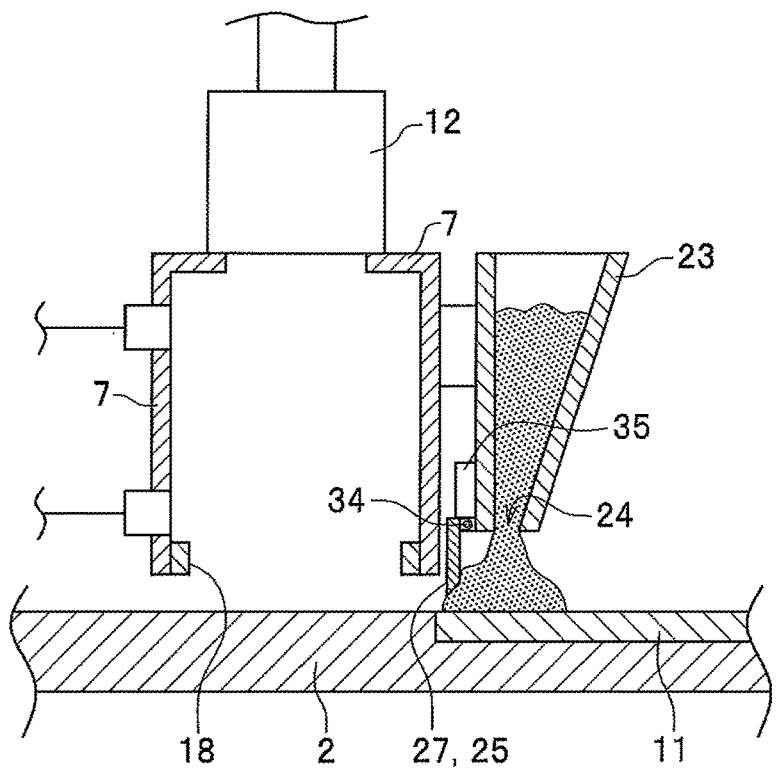
FIG. 7B is a side view of the variant structural example of the open-close door of the storage tank.

In the above, an embodiment of the present invention has been explained. The blade 27 can be utilized as the open-close door 25 which opens and closes the powder dropping opening 24 of the powder storage tank 23. As shown in FIG. 7, a bearing axis 34 is provided on an outside surface of the powder storage tank 23, and the blade 27 is arranged so as to be rotatable about the bearing axis 34. Reference numeral 35 indicates a drive source such as a motor for rotating the blade 27, which is attached to an outside surface of the powder storage tank 23 for example. As shown FIG. 7A, the blade 27 closes the powder dropping opening 24 of the powder storage tank 23 in a state where the blade 27 is oriented horizontally, and the blade 27 is rotated about the bearing axis 34 to be oriented vertically by the driving of the drive source 35, so that the powder dropping opening 24 opens to drop and deliver the powder, which is then smoothed by the lower edge of the blade 27. According to this structure, both powder smoothing function and open-close function of the powder dropping opening 24 are given to the blade 27, and the configuration of the powder delivering unit 3 and the powder flattening device 4 is simplified.

DESCRIPTION OF REFERENCE NUMERALS

1: three-dimensional object building apparatus
2: object building bed
3: powder delivering unit
4: powder flattening device
5: light beam radiating unit
6: transferring mechanism
7: shroud (a cover)
8: controller
11: object placement plate
12: light beam radiating device (light beam radiating unit)
13: powder layer
18: skirt member
19: ambient-gas supplying port
20: fume suction port
23: powder storage tank (powder delivering unit)
24: powder dropping opening
25: open-close door
27: blade (powder flattening device)
33: makeshift wall
C: gap
L: light beam
P1: object building area

What is claimed is:

1. A three dimensional molding method for molding a three-dimensional object using a powder delivering unit that delivers a powder on an molding area, a powder flattening device that flattens a surface of the powder delivered from the powder delivering unit to form a powder layer, a light beam radiating unit that is disposed above the molding area and radiates a light beam on the powder layer to sinter or melt solidify the powder for molding the object, and a cover that surrounds a space above an area of the powder layer that is smaller than the molding area around a radiation of the light beam, which are structured integrally with one another so as to be movable in three-dimensional directions, the method comprising:

a powder layer forming step of moving the cover in a lateral direction a predetermined distance so that an amount of powder corresponding to the predetermined distance is delivered by the powder delivering unit below the cover and flattened by the powder flattening device;

a molding step of radiating the light beam on the powder layer flattened through the powder layer forming step to mold a part of the object; and a single-layer forming step of forming a single powder layer by repeating the powder layer forming step and the molding step so as to continue from the part of the object, wherein when finishing the single-layer forming step, the cover member is uplifted so that the single-layer forming step is performed on the layer already built, and again the cover member is uplifted so that the single-layer forming step is repeated, before starting the single-layer forming step, the cover is positioned at a standby area formed at one lateral end side of the molding area, and as soon as the cover member starts moving, supply of a ambient-gas into the cover and suction of a fume are performed, and after starting the supply of the ambient-gas and the suction of the fume, the cover member is lowered down to block a gap made between a surface of the powder layer formed in the powder layer forming step and a lower end of the cover member.

2. The three-dimensional molding method according to claim 1, wherein every time finishing the single-layer forming step, the cover member is retreated to the standby area, and while the cover member is positioned at the standby area, the supply of the ambient-gas and the suction of the fume are suspended.

3. The three-dimensional molding method according to claim 1, wherein the powder supply unit is provided with a powder dropping opening and an open-close door for allowing the powder dropping opening to open and close, the open-close door being opened before the cover member starts moving in the lateral direction, and the open-close door being closed after finishing the single-layer forming step.

4. The three-dimensional molding method according to claim 1, the method further comprising:

a step of molding a three-dimensional makeshift wall surrounding a space around the object for preventing collapse of the powder in the space around the object to be built.

* * * * *